US 8,179,812 B2

(12) United States Patent
Vedantham et al.

(10) Patent No.: US 8,179,812 B2
(45) Date of Patent: May 15, 2012

(54) SYSTEM AND METHOD FOR PROVIDING STATUS REPORTS OF TRANSMITTED DATA PACKETS IN A DATA COMMUNICATIONS SYSTEM

(75) Inventors: Ramanuja Vedantham, Dallas, TX (US); Shantanu Kangude, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/236,001

(22) Filed: Sep. 23, 2008

(65) Prior Publication Data

US 2009/0086760 A1    Apr. 2, 2009

Related U.S. Application Data

(60) Provisional application No. 60/976,893, filed on Oct. 2, 2007.

(51) Int. Cl.
*H04L 12/56* (2006.01)
(52) U.S. Cl. .................. 370/252; 370/394; 714/748
(58) Field of Classification Search .................. 370/503, 370/200–230, 236–238, 278–281, 446–474, 370/328–338, 246–247, 356, 310.1–310.2, 370/536–545, 252–253, 389–427; 714/748, 714/749
See application file for complete search history.

(56) References Cited

U.S. PATENT DOCUMENTS

| 7,088,735 | B1 * | 8/2006 | Reohr et al. | 370/466 |
|---|---|---|---|---|
| 2007/0189332 | A1 * | 8/2007 | Phan et al. | 370/474 |
| 2007/0248025 | A1 | 10/2007 | Phan et al. | |
| 2009/0232123 | A1 * | 9/2009 | Jones et al. | 370/346 |

* cited by examiner

*Primary Examiner* — Pao Sinkantarakorn
*Assistant Examiner* — Iqbal Zaidi
(74) *Attorney, Agent, or Firm* — Ronald O. Neerings; Wade James Brady, III; Frederick J. Telecky, Jr.

(57) ABSTRACT

A digital communications system for delivering data blocks includes at least one transmit/receive unit (TRU). The TRU includes a storage element for receiving transmit data packets and retransmit data packets from a sending unit and a processing element communicatively coupled to the storage element. The processing element is configured for recognizing a failure to receive at least one other transmit data packet (missing data packet) from the sending unit, and for configuring a status control packet for transmission to the sending unit, the control packet includes a header including a next packet identifier for a next data packet anticipated to be received and a status payload portion including a missing packet identifier including the transmit packet identifier for the missing data packet. In the system, the retransmit data packet includes at least a segment of the data payload in the missing data packet associated with the missing packet identifier.

25 Claims, 5 Drawing Sheets

SYSTEM AND METHOD FOR PROVIDING STATUS REPORTS OF TRANSMITTED DATA PACKETS IN A DATA COMMUNICATIONS SYSTEM

CROSS REFERENCE TO RELATED APPLICATION

This application claims the benefit of Provisional Application Ser. No. 60/976,893 entitled "RLC Status Report Format For LTE", filed Oct. 2, 2007, which is herein incorporated by reference in its entirety.

FIELD OF THE INVENTION

The present invention relates generally to digital communications systems and more particularly to status control packets for digital communications systems.

BACKGROUND

The following abbreviations are herewith defined:
3GPP Third Generation Partnership Project
AMC Adaptive modulation and coding
DL downlink (Node B to UE)
H-ARQ hybrid automatic repeat request
HSPA high speed packet access
IP internet protocol
L1 Layer 1 (Physical (PHY) Layer)
L2 Layer 2 (Link Layer)
LTE Long Term Evolution
MAC medium access control
Node B base station
OFDMA orthogonal frequency division multiple access
PDU protocol data unit
QoS quality of service
RF radio frequency
SC-FDMA single carrier-frequency division multiple access
SDU service data units
TB transport block
TTI transmission time interval
UE user equipment
UL uplink (UE to Node B)
UMTS Universal Mobile Telecommunications System
UTRA Universal Terrestrial Radio Access
UTRAN Universal Terrestrial Radio Access Network
E-UTRAN Evolved UTRAN In advanced cellular networks, such as UTRA LTE, when IP packets are transmitted over the radio interface using these different spectrum allocations, the link layer (L2) of the radio interface, including the MAC functionality, can segment IP-based SDUs passed down by an upper layer into one or several segments and, at the same time, pack one or multiple segments into a PDU for further physical layer (L1) transmission. These two processes, L2 SDU segmentation and L2 PDU packing are both needed to ensure robust transmissions of IP packets with variable packet sizes in bits or bytes over radio channels with variable bit rates. However, these segmentation and packing processes typically result in an increased overhead in the processing of IP packets. This introduces the need for efficient packet header mechanisms to minimize the overhead in processing the IP packets.

SUMMARY

This Summary is provided to briefly indicate the nature and substance of the invention in compliance with 37 C.F.R. §1.73. It is submitted with the understanding that it will not be used to interpret or limit the scope or meaning of the claims.

In a first embodiment of the present invention, a method for delivery of one or more data blocks in a digital communications is provided. The method includes receiving a plurality of transmit data packets from a sending unit and recognizing a failure to receive at least one other transmit data packet (missing data packet) from the sending unit. The method also includes transmitting at least one status control packet to the sending unit, the control packet including a header including a next packet identifier for a next data packet anticipated to be received and at least one status payload portion including at least one missing packet identifier, the missing packet identifier including the transmit packet identifier for the missing data packet. The method further includes receiving at least one retransmit data packet from the sending unit, the retransmit data packet including at least a segment of the data payload in the missing data packet associated with the missing packet identifier.

In a second embodiment of the present invention, a digital communications system for delivering one or more data blocks is provided. The system can include at least one transmit/receive unit (TRU). The TRU can include a storage element for receiving a plurality of transmit data packets and least one retransmit data packet from a sending unit and a processing element communicatively coupled to the storage element. The processing element can be configured for recognizing a failure to receive at least one other transmit data packet (missing data packet) from the sending unit, and configuring at least one status control packet for transmission to the sending unit, the control packet including a header including a next packet identifier for a next data packet anticipated to be received and at least one status payload portion including at least one missing packet identifier, the missing packet identifier including the transmit packet identifier for the missing data packet. In the system, the retransmit data packet includes at least a segment of the data payload in the missing data packet associated with the missing packet identifier.

DETAILED DESCRIPTION

Figure 1:
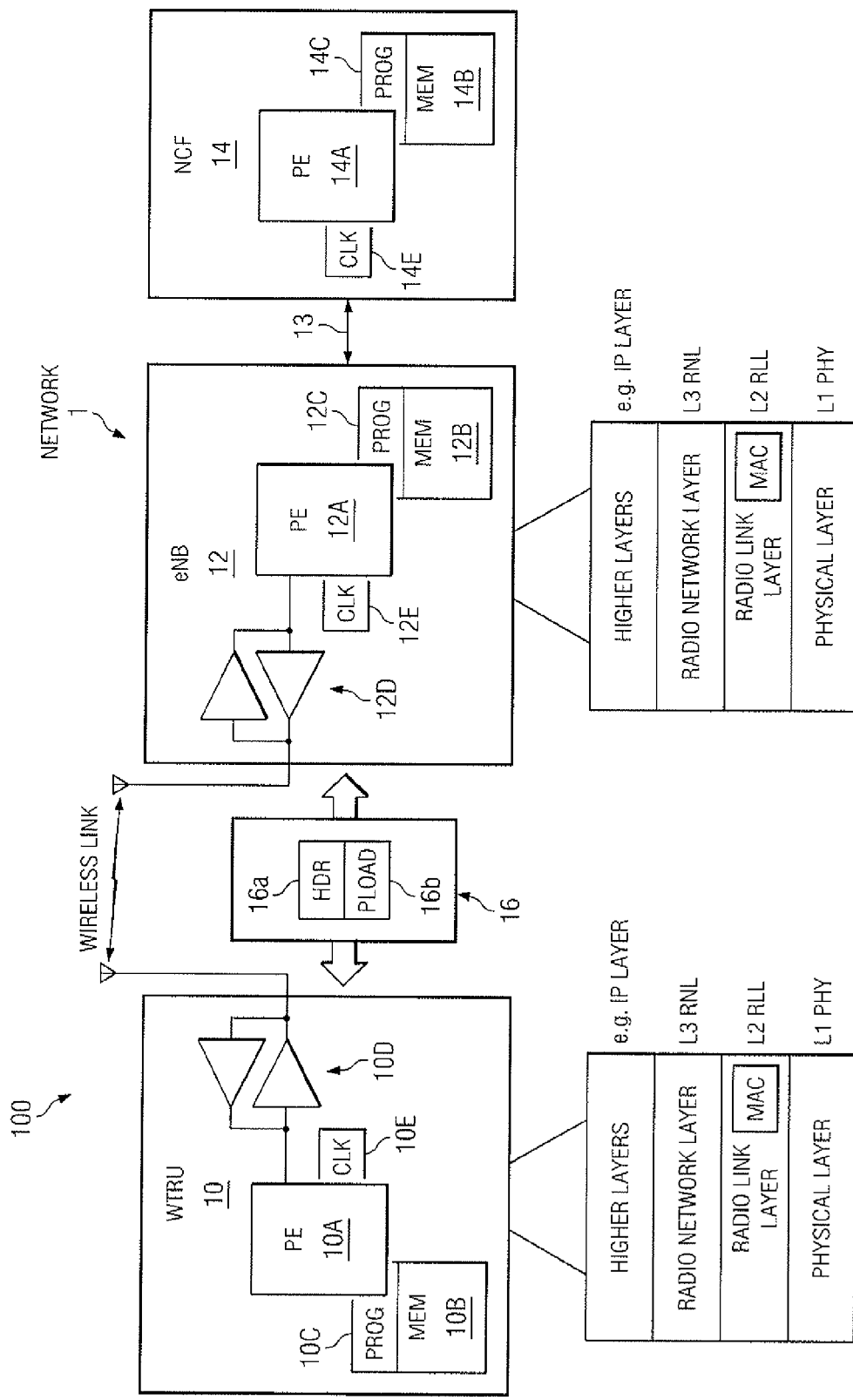
FIG. 1 shows a simplified block diagram of a wireless communications system configured according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention include systems and methods in a wireless communications system for providing standardized status control packets having reduced generation and parsing requirements. In particular, embodiments of the present invention generate a byte-complete status control packet including pre-defined formats for the various portions of the control packet for reducing the computational complexity for parsing the control packet. In the various embodiments of the present invention, the status control packets are used to request a sending unit to retransmit data that a receiving unit has failed to receive.

Furthermore, in embodiments where retransmitted data is segmented into two or more retransmit data packets and a receiving unit fails to receive at least one of the retransmit data packets, the format of the status report packet can include additional segmentation information. The additional segmentation information can reduce the amount parsing required at a sending unit by identifying the portion of the segmented that have not been received at a receiving unit. In some embodiments of the present invention, to further reduce parsing complexity, the byte-complete status control packet can be further formatted to provide a byte-aligned status control packet.

Although the exemplary embodiments will generally be described herein in terms of a WTRU and an eNB in a LTE wireless communications system, the embodiments of the present invention are not limited in this regard. Rather the present invention can generally be used with any type of transmit/receive units (TRU) operating with any other type of digital communications systems and/or protocols for managing other types of digital communications, including wireless, optical, or wire line digital communications systems.

As used herein, a "wireless transmit/receive unit" or "WTRU" can include, but is not limited to any particular type of user equipment (UE) comprising a TRU, including, but not limited to a mobile station, a fixed or mobile subscriber unit, a pager, a cellular telephone, a personal digital assistant (PDA), a computer, or any other type of user device capable of operating in a wireless environment. Also as used herein, an "eNB" includes but is not limited to a base station, an evolved Node B, a site controller, an access point (AP), or any other type of interfacing device capable comprising a TRU and operating and supporting communications in a wireless environment.

FIG. 1 shows a simplified block diagram of a wireless communications system 100 configured according to an embodiment of the present invention. As shown in FIG. 1, the wireless communications system 100 includes a wireless network 1 is adapted for communication between TRUs and in particular WTRUs and eNBs, such as WTRU 10 via an eNB 12. The network 1 can include at least one network control function (NCF) 14. The WTRU 10 includes a processing element (PE) 10A, a memory element (MEM) 10B that stores a program (PROG) 10C, a suitable RF transceiver 10D for bidirectional wireless communications with the eNB 12, and an internal timer or clock 10E. The eNB 12 can also include a PE 12A, a MEM 12B that stores a PROG 12C, a suitable RF transceiver 12D, and an internal timer or clock 12E. The eNB 12 can be coupled via a data path 13 to the NCF 14 that also includes a PE 14A and a MEM 14B storing an associated PROG 14C. In the various embodiments of the present invention, at least one of the PROGs 10C and 12C can include program instructions that, when executed by the associated one of PE 10A and PE 12A, enable the WTRU 10 or the eNB 12 to operate in accordance with exemplary embodiments of this invention, as will be discussed below in greater detail.

The WTRU 10 can further include and implement a protocol stack 10F containing at least layers L1 (PHY, Physical), L2 (RLL, Radio Link Layer, containing the MAC functionality) and L3 (RNL, Radio Network Layer), and typically higher layers as well (e.g., an IP layer). The eNB 12 can also include and implement a protocol stack 12F also containing at least layers L1 (PHY), L2 (RLL) and L3 (RNL), and typically also the higher layers as well (e.g., an IP layer).

In general, the MEMs 10B, 12B and 14B can be of any type suitable to the local technical environment and can be implemented using any suitable data storage technology, such as semiconductor-based memory devices, magnetic memory devices and systems, optical memory devices and systems, fixed memory and removable memory. The PEs 10A, 12A and 14A can be of any type suitable to the local technical environment, and can include one or more of general purpose computers, special purpose computers, microprocessors, digital signal processors (DSPs) and processors based on a multi-core processor architecture, as non-limiting examples.

The WTRU 10 and the eNB 12 can be configured to exchange one or more packets 16, including but not limited to SDU's and PDU's. Each packet 16 can include a header portion 16a which provides packet identifier information and a data payload portion 16b for exchanging additional identifier information, commands, or one or more segments of a data block. In general, the MEMs 10B, 12B, and 14B are not limited solely for storage of the associated PROG. Rather, in the various embodiments of the present invention, the MEMs 10B, 12B, and 14B can also be utilized as buffer for storing copies of the transmitted data packet until the receiving unit confirms receipt of such.

In the current development of L2 concepts for E-UTRAN, several options for MAC protocol structures and functions have been proposed. In general, these options differ in the area of data block segmentation. A first option follows a similar approach as used in the current HSPA in UTRAN, wherein semi-static segmentation sizes for certain logical channels are used, and where segments can have a fixed size or a fixed size limit that is adjusted according to user-specific characteristics and averaged radio conditions. A second option proposes a dynamic, on-the-fly segmentation per TTI. In this approach any required segmentation is performed after the scheduling decision is made, and the available TB size (i.e. the transmitted data packet size) has been determined. However, regardless of how data blocks are segmented, the segmentation and packing process for transmitted data packets adds additional computation complexity.

Figure 2:
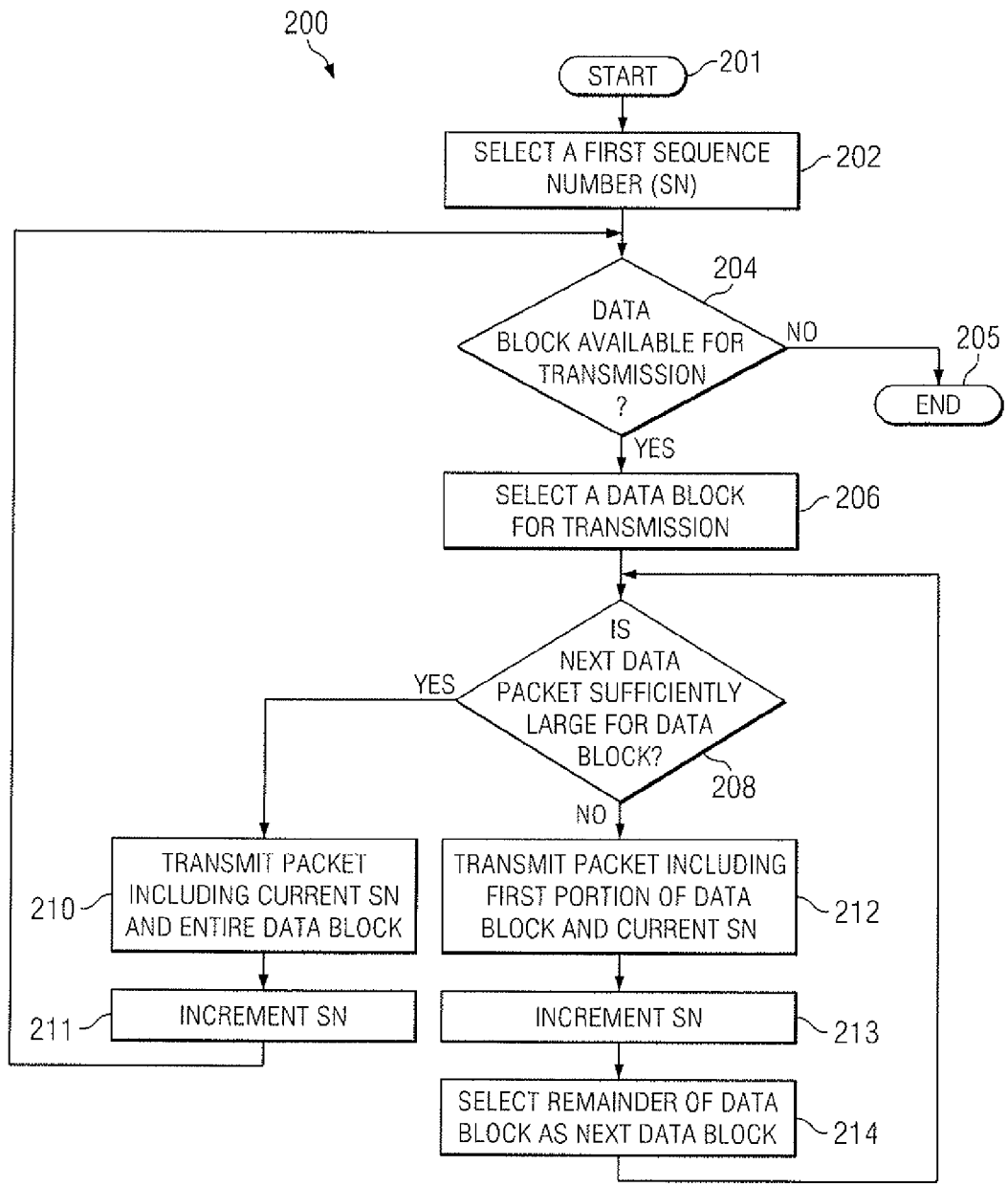
FIG. 2 depicts a logic flow diagram for transmitting data blocks in a wireless communications system in accordance with an embodiment of the present invention.

FIG. 2 depicts a logic flow diagram 200 for transmitting data blocks in a wireless communications system in accordance with an embodiment of the present invention. The method can start in step 201 and proceed to step 202. In step 202, a sequence number (SN) is selected to be associated with a next transmitted data packet is selected by the sending unit. Next, in step 204, the sending unit can check to see if any data blocks need to be transmitted to the receiving unit. If no additional data blocks need to be transmitted method 200 ends with step 205.

If at least one data block is available for transmission in step 204, then the sending unit selects a data block in step 206. Although the SN can be used to generate a header portion of a data packet and the selected data block can be used as the payload portion, in many cases the available TB size limits the size of data packets. Accordingly, the sending unit can then determine in step 208 whether the next data packet is sufficiently large to include the entire data packet selected in step 206. If the packet size is determined to be sufficient in step 208, in step 210 the sending unit can transmit a data packet including the current SN and the entire data block. Afterwards, the sending unit can increment the SN in step 211 and check to see if any additional data packets need to be transmitted in step 204 for the next TTI. Additionally, a copy of the transmitted data packet is stored in the portions of the MEM for the sending unit utilized as a buffer.

If the packet size is determined to be insufficient in step 208, in step 212 the sending unit can transmit a data packet including the SN in the header portion, but only a portion or segment of the data block in the data payload. Afterwards, the sending unit can increment the SN in step 211. The sending unit, in step 214, can then select the remaining portion of the data block as the next data block to be transmitted and steps 204-214 can be repeated until the entire data block is transmitted. The method can then end in step 205 if no other data blocks need to be transmitted.

Figure 3:
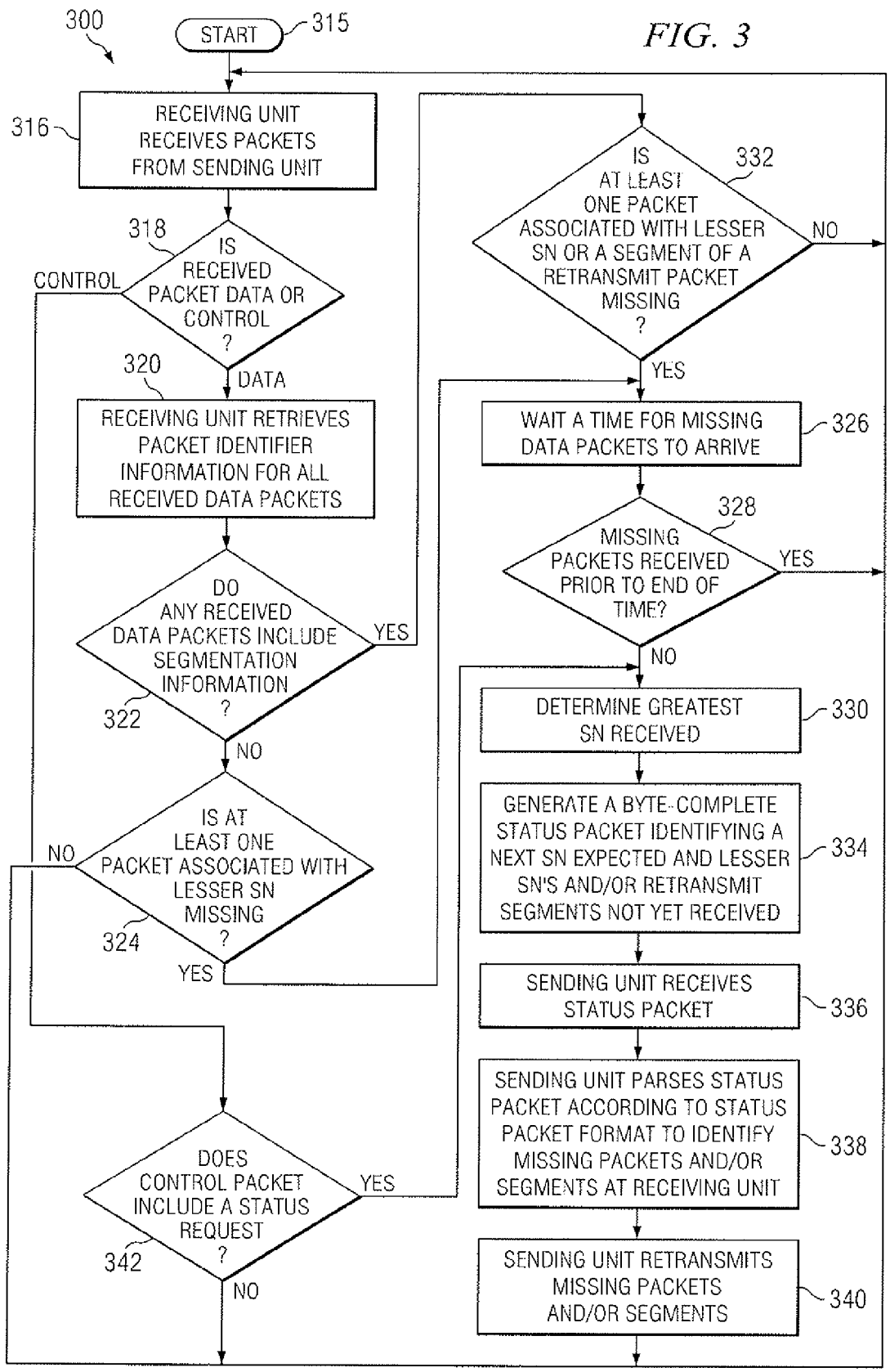
FIG. 3 depicts a logic flow diagram for generating status control packets and retransmitting data packets in a wireless communications system in accordance with an embodiment of the present invention.

Alternatively or in combination with method 200 in the sending unit, method 300 can operate to deal with missing data packets at the receiving unit. FIG. 3 depicts a logic flow diagram 300 for generating status control packets and retransmitting data packets in a wireless communications system in accordance with an embodiment of the present invention. The method can start with step 315 and proceed to step 316. In step 316, the receiving unit can receive the packet(s). Upon receipt of a packet, in step 318, the receiving unit first makes a determination as to whether the received data packet is a data packet or a control/service packet. In the case of a data packet, as data packets are received, the receiving unit, in step 320 collects packet identifier information for all data packets received from the sending unit. In step 322, the receiving unit can then determine if any packets are segmented packets. That is, whether any packets contain information indicating that they are a portion or segment of a previously transmitted data packet. These types of packets are described below in greater detail with respect to FIG. 4B.

If it is determined that no packets are segmented in step 322, the receiving unit can simply determine if any lesser SN's are missing in step 324. That is, as previously described in FIG. 2, each data packets transmitted by the sending unit is associated with one of an sequence of SN's and a missing packet can be identified based on determining the largest SN for the data packet received and identifying any SN's less than the largest SN which have not been associated with any of the data packets received at the sending unit. If no missing SN's are determined to exist at step 324, the receiving unit can continue to receive packets starting at step 316.

However, if at least one SN is missing in step 324, in step 326 the receiving unit can wait a limited time before making a final conclusion that the data packet failed to reach the receiving unit. For example, the receiving unit can wait until a CLK in the receiving unit counts down a pre-determined amount of time, typically 10-100 ms. For example, in the case of LTE systems, the wait time is typically 25-35 ms. If at the end of the time period it is determined that the missing data packet has not yet arrived in step 328, a failure can be identified and method 300 can proceed to step 330.

In cases where at least one of the data packets received at the receiving unit is segmented in step 322, a similar process can follow. First, in step 332 the receiving unit can identify any missing SN's and any segments that are missing. That is, for data packets including segment identifier information, as described below with respect to FIG. 4B, any gaps in segment information can be identified. Afterwards, in step 326 and 328, the receiving unit can wait a time, as previously described, to see if the missing SN's or segments arrive before making a final conclusion that a data packet failed to reach the receiving unit. If the missing SN's or segments are found prior to the end of the wait time, the method 300 can continue receiving packets starting with step 316. Otherwise, responsive to detecting a failure in receiving a packet, the receiving unit can generate a status control packet for the sending unit starting with step 330.

In step 330, the receiving unit can determine the largest or greatest SN associated with the data packets received at the receiving unit. The receiving unit can then generate a byte-complete status control packet in step 334. The header can include a next SN for a next packet anticipated to be received at the receiving unit. The next SN can be determined based on determining the largest or greatest SN associated with the data packets received at the receiving unit and incrementing the sequence one position higher. The status control packet can also include the lesser SN's that have failed to reach the receiving unit as part of the data payload, as previously described. Furthermore, for missing segments, not only can the status control packet include the associated SN, but a location within the data block for the missing segment. Additionally, one or more other bits can be included in the packet to create a byte-complete or byte-aligned packet. Exemplary configurations of the status control header will be described below in greater detail with respect to FIGS. 5A, 5B, 6A, and 6B.

Once the status control packet has been generated in step 334, the receiving unit can transmit the status control packet in step 336. The sending unit can then receive and parse the packet in step 338. In the various embodiments of the present invention, the amount of parsing required is reduced due to the byte-completeness or byte alignment of the header. In the case of byte-aligned packets, since the header portion and the payload portions correspond to a pre-determined arrangement of bytes, the sending unit can directly parse the bytes for the header and any missing SN's. The pre-determined arrangement will be described below in greater detail.

After the status control packets are parsed by the sending unit in step 338 to retrieve the next SN and the missing SN's or segments in step 338, in step 340 the sending unit can retrieve buffer copies of the data block associated with the missing SN's or any of the missing segments, as well as their associated SN. The sending unit can then retransmit the data blocks or segments starting with step 306, as previously described.

Although method 300 has been described with respect to a receiving unit triggered status control packet, the various embodiments of the present invention are not limited in this regard. In some embodiments, a sending unit can trigger generation of a status control packet in the receiving unit. In such cases, if one of the packets received in step 316 is determined to be a control packet in step 318, the method 300 can first determine in step 342 if the control packet is a status request packet. If the packet is a status request packet in step 342, the method 300 can proceed starting with step 330. If the control packet is not a status request packet in step 342, the receiving unit can continue to monitor for other packets starting with step 316.

Figure 4A:
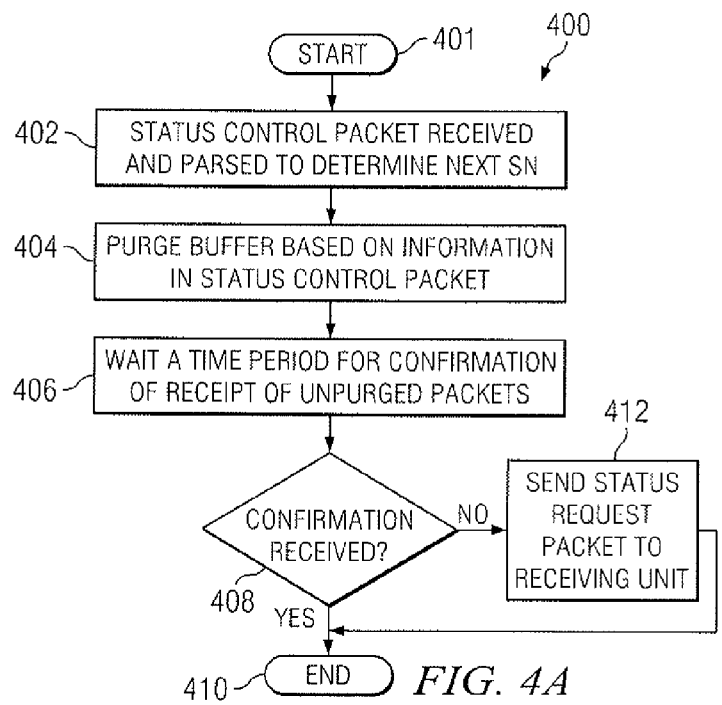
FIG. 4A depicts a logic flow diagram for a sending unit to generate status requests in accordance with an embodiment of the present invention.

An exemplary flow diagram for a method 400 for generating such a status request packet is shown in FIG. 4A. FIG. 4A depicts a logic flow diagram 400 for a sending unit to generate status requests in accordance with an embodiment of the present invention. The method can start in step 401 and proceed to step 402. In step 402, a status control packet is received and parsed to determine the next SN and missing SN's, as previously described with respect to FIG. 2. Next, in step 404, the buffer in the sending unit is purged based on the information in the status control packet. That is, the data packets not associated with the missing SN's or that are less than the next SN are purged from the buffer. Afterwards, in step 406 the sending unit waits a time period for confirmation of the receipt of the unpurged data packets in the buffer. In step 408, if a confirmation is received for all the unconfirmed packets, the method 400 ends in step 410. That is, the sending unit receives additional status control packets indicating the receipt of the unpurged data packets in the buffer. If confirmation is not received in step 408, the sending unit can transmit a status request packet to the receiving unit in step 412 and the method can end in step 410.

Figure 4B:
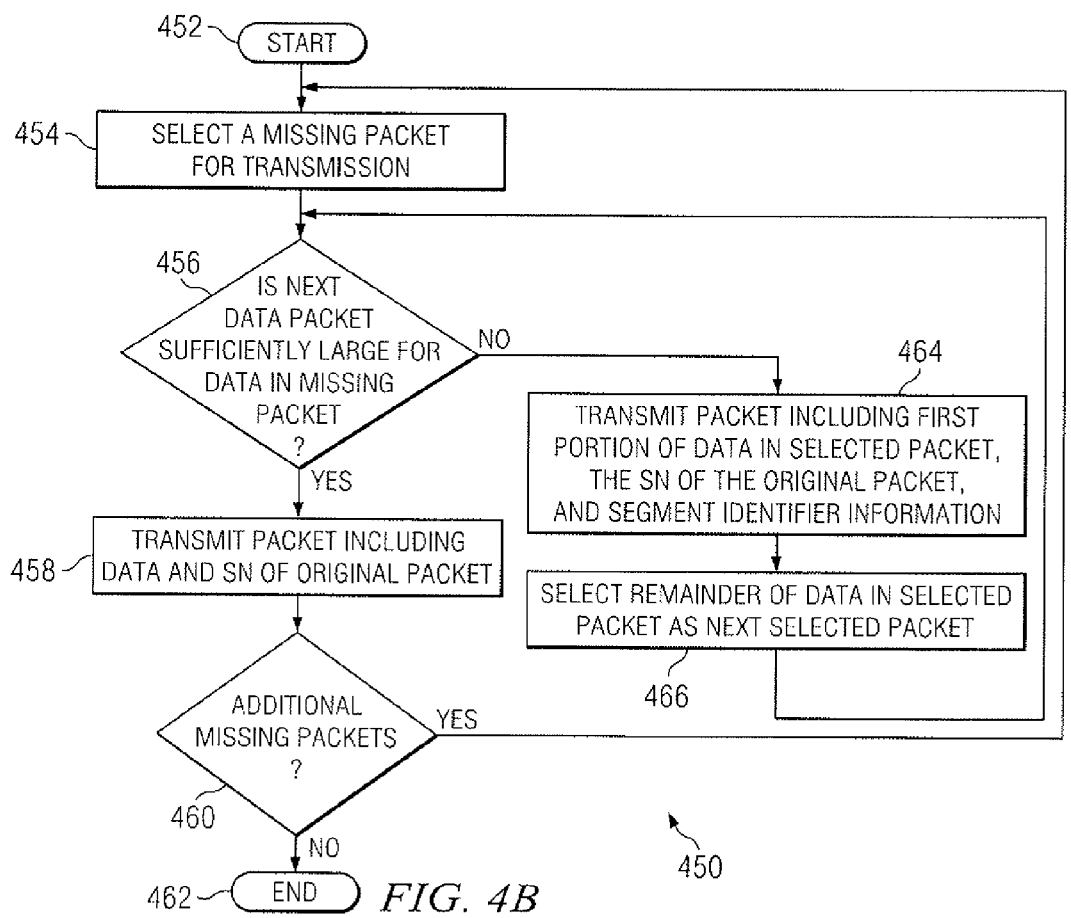
FIG. 4B depicts a logic flow diagram for a sending unit to retransmit missing data packets in accordance with an embodiment of the present invention.

Referring back to FIG. 3, once a status control packet has been received and parsed by the sending unit in step 338, the sending unit can retransmit the missing data in step 340. This is described in greater detail with respect to FIG. 4B. FIG. 4B depicts a logic flow diagram 450 for a sending unit to retransmit missing data packets in accordance with an embodiment of the present invention. The method 450 can start with step 452 and continue to step 454. In step 454, the sending unit can select one of the missing data packets identified in step 338 in FIG. 3. These missing data packets are retrieved from the portion of the MEM of the sending unit being utilized as a buffer. Accordingly, the retrieved packet includes not only the data, but also the SN originally associated with the data. Afterwards, in step 456, the sending unit, as previously described in step 208 in FIG. 2, can determine whether a next data packet to be transmitted is sufficiently large to include the entire missing packet selected in step 454. If sufficient space is found in step 456, the next data packet is transmitted, including the data payload of the missing packet and the SN originally associated with the missing packet.

If insufficient space is found in step 456, the next data packet is transmitted to include a first portion or segment of the data in the selected missing packet, the SN originally associated with the selected missing packet, and segment identifier information. That is, the next data packet includes information for identifying which segment of the missing data packet is being transmitted. Such information can include a length, a beginning segment offset (BSO), and ending segment offset (ESO), or any other type of information that identifies the location of the segment in the missing data packet. Afterwards, the remaining portion of the data packet can be selected as the next data packet for retransmission in step 466 and steps 456-466 can be repeated until all segments are retransmitted.

As previously described, reduced computation during parsing of the status control packet is provided by including a byte-complete or byte-aligned status control packet. A "byte-complete" (BC) packet, as used herein, refers to a packet having a number of bits equal to a whole number of bytes (8 bits per byte). A "byte-complete and byte-aligned" (BC/BA) packet, as used herein refers, to a packet having not only a number of bits equal to a whole number of bytes, but also in which the header comprises a whole number of bytes and in which each field in the data payload associated with a missing SN also comprises a whole number of bytes. In the various embodiments of the present invention, either byte-complete or byte-aligned status control packets can be used. Byte-complete control packets reduce the size of the packet, but require additional computation during parsing. Byte-aligned control packets are easier to parse, but are typically larger in size. An exemplary set of BC/BA and BC status control packets is shown in FIGS. 5B and 5A respectively.

Figure 5A:
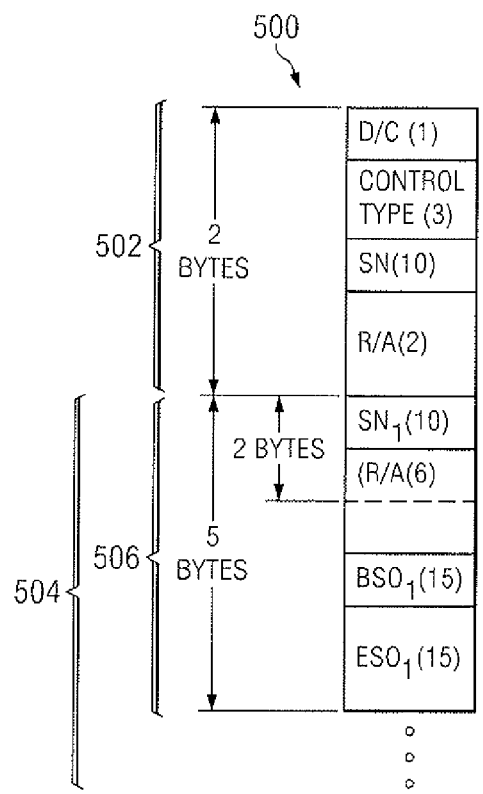
FIG. 5A illustrates a format for a byte-complete status control packet according to an embodiment of the present invention.
Figure 5B:
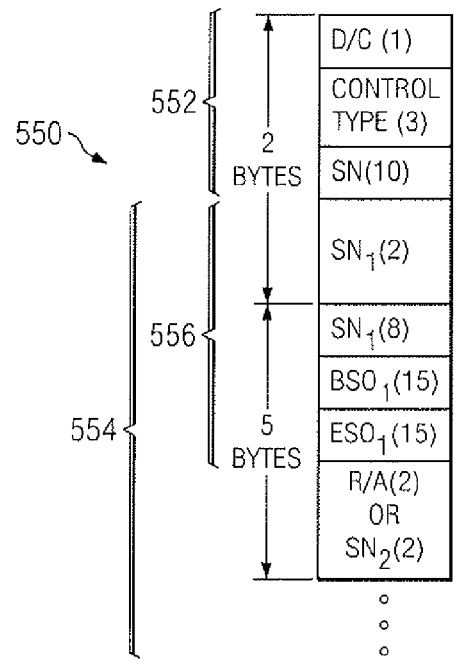
FIG. 5B illustrates a format for a byte complete and byte-aligned status control packet according to another embodiment of the present invention.

FIG. 5A illustrates a basic format 500 for a BC/BA status control packet according to an embodiment of the present invention. The format 500 provides for two different portions, a header 502 and a payload 504. As shown in FIG. 5A, the header, like a standard header in a wireless communications system, includes a first bit (D/C) for specifying whether the packet includes data or control information and second, third, and fourth bits (Control Type) for specifying whether the type of control packet. The header can also include the next SN value, typically a 10 bit number in a cumulative acknowledgement (ACK) field. The value in the ACK field is cumulative as it indirectly identifies the largest SN received, as previously described. In the case of a BC/BA status control packet, the header is byte aligned, therefore, since the first bits only provide 14 bits, two short of a full two bytes, an additional set of two bits is added to the header (R/A), which can be used for other functions, as described below. If no missing SN's or segments exist, the control status header would end after the R/A bits. However, if a segment or an SN is missing, additional bits can be provided in the data payload portion 504.

As shown in FIG. 5A, the data payload portion 504 includes one or more negative acknowledgement (NACK) fields indicating the data block or segments thereof not received by the receiving unit. In the case of missing SN's the NACK field can include a 10-bit SN for a missing SN ($SN_1$). Afterwards to provide a whole number of bytes or byte align another missing SN, an additional six bits (R/A) can be provided. In the case of a missing segment, the NACK field 506 can include a 15-bit beginning setoff value ($BSO_1$) and a 15-bit ending setoff value ($ESO_1$) indicating the portion of the data block associated with SN1 that was not received by the receiving unit. Such values can be determined based on the information specified in the data packets for retransmitted that that was segmented, as previously described in FIG. 4B. In FIG. 5A, since the length of $SN_1$, $BSO_1$, and $ESO_1$ are equal to a whole number of bytes (40-bits or 5 bytes), the additional bits (R/A) are not needed. However, one of ordinary skill in the art will recognize that in cases where SN1, $BSO_1$, and $ESO_1$ provide less than a whole number of bytes, the additional bits (R/A) can be inserted anywhere in the NACK field 506. Additional NACK fields can then be added for each additional missing SN or segment in the same fashion.

In the case of a BC status control packet, a similar format can be used. However, rather than inserting additional bits to byte align the head and each of the NACK fields, any additional bytes are added at the end of the status control packet to provide a whole number of bytes. This is illustrated in FIG. 5B.

FIG. 5B illustrates a basic format 550 for a BC status control packet according to another embodiment of the present invention. As in FIG. 5A, the status control header includes a header 552 and a payload 554 including one or more NACK fields 556. However, the header 552 includes no additional bytes. Instead, the first portion of the first NACK field 506 is started immediately after the header portion. In terms of bytes, this results in SN1 being divided among two bytes as shown in FIG. 5B. The remainder of the NACK field 556 follows. If the last NACK field 556 does not provide a whole number of bytes the additional bytes are provided. As shown in FIG. 5B, this means adding 5 additional bits after NACK field 556. In such cases, even if not byte-aligned, the format can still be provided to the sending unit to allow it to directly access the header and each of the NACK fields.

One potential shortcoming of the embodiment in FIGS. 5A and 5B is the fact that without using the additional bits in the BC/BA status control packet to provide additional information, parsing at the sending unit is considerably more complex. For example, in the case where the status control packet is part of another packet, it can be difficult to determine where the status control packet begins and ends. Even if transmitted by itself, such control packets require additional parsing, as the sending unit will have to make assumptions about the content of the NACK fields based on the length of the NACK fields. As a result, it is possible that a status control packet of a particular length could be interpreted in two ways. Therefore, in the various embodiments of the present invention, at least a portion of the additional bits (R/A) can be utilized as extension or end of field flags to identify whether additional data in the status control packet should be read and the type of data therein. Such flags further reduce the amount of parsing required at the sending unit for identifying missing SN's in the status control packet.

Figure 6A:
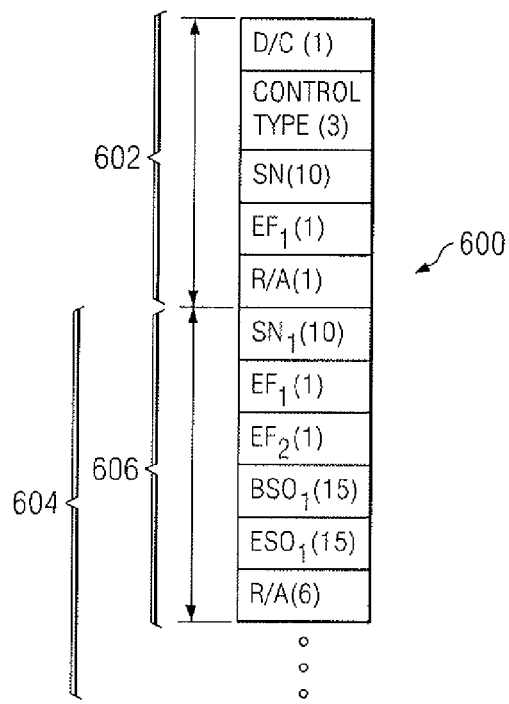
FIG. 6A illustrates an alternate format for a byte-complete status control packet including extension fields and segment fields according to still another embodiment of the present invention.

FIG. 6A illustrates an alternate format for a BC/BA status control packet including extension field flags and segment field flags, according to still another embodiment of the present invention. FIG. 6A shows a format 600 similar to format 500 in FIG. 5A, including a header 602, a payload 604, and one or more NACK fields 606. However, at least one of the R/A bits is replaced with a one bit extension flag ($EF_1$) indicating whether additional data (in the form or NACK fields is available). Therefore, during reading of the status control packet, the sending unit can check $EF_1$ in the header 602 before attempting to parse any other portions of the packet 600. If EF1 indicates that additional data is present (e.g., EF1=1), then the next byte can be parsed. Otherwise (e.g., EF1=0), no other bytes are parsed in the packet 600. The remainder of the header bytes can still be filled with an additional bit (R/A).

However, extension flags are not limited to solely the header and can also be used in the NACK fields to indicate the presence of other NACK fields and segment identifier data (e.g., BSO1, ESO1). This is illustrated in FIG. 6A. As shown in FIG. 6A, NACK field 606 can include SN1, BSO1, and ESO1 fields as previous described in FIG. 5A. However, to simplify parsing, two additional bits for extension flags are provided. First, an extension flag indicating additional data (EF1) is included in the NACK field 606. Like EF1 in the header 602, the EF1 in the NACK field 606 indicates whether additional NACK fields are present in the packet 600. Second an additional extension flag (EF2) is included in the NACK field 606, EF2 is provided to indicate whether segment identifier data follows or whether to proceed to the next byte. In operation, after reading the missing SN (SN1), the sending unit can first check EF1 in NACK field 606 to see whether additional NACK fields are present in packet 600. The sending unit can also check EF2 to see whether the missing SN (SN1) is associated with segmented data. Therefore, the sending unit can act according to Table 1:

TABLE 1

Sending Unit Response to Extension Fields

| $EF_1$ | $EF_2$ | Sending Unit Action |
|---|---|---|
| 0 | 0 | (No additional data, no segment identifier data) Sending unit reads no further portions of the status control packet |
| 0 | 1 | (No additional data, segment identifier data present) Sending unit assumes remainder of packet includes only segment identifier information (BSO1, ESO1) and reads segment identifier information |
| 1 | 0 | (Additional data, no segment identifier data) Sending unit assumes an additional missing SN begins at start of next byte and skips to start of next byte. |
| 1 | 1 | (Additional data, segment identifier data present) Sending unit assumes at least one other NACK is present in packet and reads a number of bits sufficient for segment identifier information before skipping to a start of a next byte. |

Such a configuration allows the sending unit to automatically parse the information in the status control packet based only on the content of the extension flags, decreasing the amount of computation and analysis required.

Figure 6B:
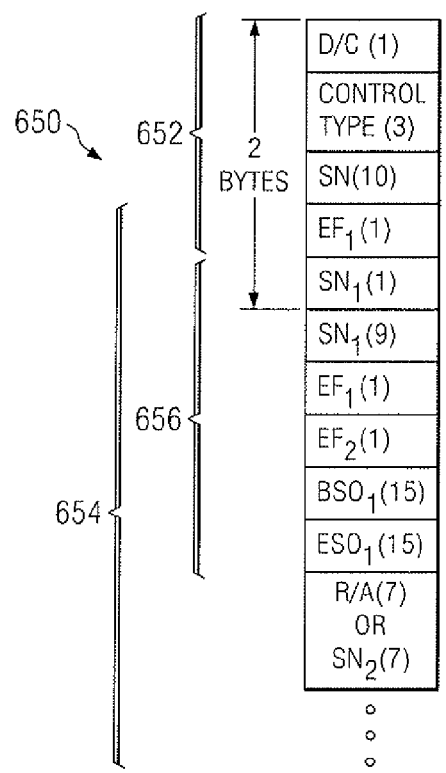
FIG. 6B illustrates an alternate format for a byte-complete and byte aligned status control packet including extension fields and segment fields according to yet another embodiment of the present invention.

However, such extension flags are not solely limited to BC/BA status control packet. For example, in some embodiments of the present invention, the extension flags can be also used for BA status control packets. This is illustrated in FIG. 6B. FIG. 6B illustrates an alternate format 650 for a byte-complete status control packet including extension fields and segment fields according to yet another embodiment of the present invention. As in FIG. 6A, the status control header includes a header 652, including an extension flag EF1 and a payload 654 including one or more NACK fields 656 with extension fields EF1 and EF2. However, the header 652 includes no additional bytes, as previously described in FIG. 5B. Instead, the first portion of the first NACK field 606 is started immediately after the header portion. In terms of bytes, this results in SN1 being divided among two bytes as shown in FIG. 6B. The remainder of the NACK field 656 follows. If the last NACK field 656 does not provide a whole number of bytes, the additional bytes are provided (R/A). As shown in FIG. 6B, this means adding 7 additional bits after NACK field 656. In such cases, even if not byte-aligned, the format can still be provided to the sending unit to allow it to directly access the header and each of the NACK fields. In particular, the sending unit can assume particular field lengths based on the extension field flag values. Thus the operation of the sending unit is identical to that described in Table 1, with the exception that the instead of moving to a next byte, the sending unit moves to the end of current header or NACK field.

These are but a few examples. Accordingly, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A method for delivery of one or more data blocks in a digital communications, the method comprising:
   receiving a plurality of transmit data packets from a sending unit;
   recognizing a failure to receive at least one other transmit data packet (missing data packet) from said sending unit;
   transmitting at least one status control packet to said sending unit, said control packet comprising a header including a next packet identifier for a next data packet anticipated to be received and at least one status payload portion including at least one missing packet identifier, said missing packet identifier comprising said transmit packet identifier for said missing data packet; and
   receiving at least one retransmit data packet from said sending unit, said retransmit data packet comprising at least a segment of said data payload in said missing data packet associated with said missing packet identifier.

2. The method of claim 1, wherein said plurality of transmit data packets are received via a optical communications interface, a wireless communications interface, or a wire line communications interface.

3. The method of claim 1, wherein said status control packet further comprises additional bits in at least one of said header portion and said status payload portion for increasing a total bit count for said status control packet to a whole number of bytes.

4. The method of claim 3, where said recognizing step comprises: extracting said transmit packet identifier associated with each of said plurality of transmit packets; identifying said missing data identifier based on extracting; repeating said extracting and said identifying for at least a first time; and if said missing data identifier is still identified at an end of said first time, specifying said one of said transmit data packets associated with said missing packet identifier as said missing data packet.

5. The method of claim 1, wherein said transmit packet identifier comprises a transmit sequence number (SN), said transmit SN specifying said sequence of transmission of transmit data packets from said sending unit.

6. The method of claim 5, wherein each of said retransmit data packets further comprises a retransmit SN said retransmit SN specifying said transmit SN associated with said data payload in each of said retransmit data packets.

7. The method of claim 6, wherein at least one of said retransmit data packets further comprises a retransmit segment identifier, and said retransmit segment identifier specifying a location in said data payload of said segment in said retransmit data packet associated with said one of said missing packet identifiers.

8. The method of claim 5, wherein said transmitting comprises generating said header portion for said status control packet, wherein said generating further comprises:
   identifying a greatest SN of said transmit data packets received at said receiving unit; and
   constructing said header portion to include a next SN comprising said greatest SN which has been incremented by 1.

9. The method of claim 5, wherein said status payload portion comprises one or more negative acknowledgement (NACK) fields, each of said NACK fields including one of said missing packet identifiers.

10. The method of claim 9, wherein said one of said missing packet identifiers is associated with said segmented packet identifier, and wherein a one said NACK fields associated with said segmented packet identifier comprises a beginning segment offset (BSO) identifier and an ending segment offset (ESO) identifier for specifying said location of said segment transmitted in said segmented data packet in said one of said data blocks.

11. A digital communications system for delivering one or more data blocks, the system comprising at least one transmit/receive unit (TRU), said TRU comprising:
   a storage element for receiving a plurality of transmit data packets and least one retransmit data packet from a sending unit; and
   a processing element communicatively coupled to said storage element, said processing element for configured for:
      recognizing a failure to receive at least one other transmit data packet (missing data packet) from said sending unit, and
      configuring at least one status control packet for transmission to said sending unit, said control packet comprising a header including a next packet identifier for a next data packet anticipated to be received and at least one status payload portion including at least one missing packet identifier, said missing packet identifier comprising said transmit packet identifier for said missing data packet, wherein said retransmit data packet comprises at least a segment of said data payload in said missing data packet associated with said missing packet identifier.

12. The system of claim 11, further comprising a transceiver communicatively coupled to at least said processing element, said transceiver comprising at least one among an optical communications interface, a wireless communications interface, and a wire line communications interface.

13. The system of claim 11, wherein said status control packet further comprises additional bits in at least one of said header portion and said status payload portion for increasing a total bit count for said status control packet to a whole number of bytes.

14. The system of claim 11, wherein said processing element is further configured during said recognizing for:
   extracting said transmit packet identifier associated with each of said plurality of transmit packets;

identifying said missing data identifier based on extracting;
repeating said extracting and said identifying for at least a first time; and
if said missing data identifier is still identified at an end of said first time, specifying said one of said transmit data packets associated with said missing packet identifier as said missing data packet.

15. The system of claim 11, wherein said transmit packet identifier comprises a transmit sequence number (SN), said transmit SN specifying said sequence of transmission of transmit data packets from said sending unit.

16. The system of claim 15, wherein each of said retransmit data packets further comprises a retransmit SN said retransmit SN specifying said transmit SN associated with said data payload in each of said retransmit data packets.

17. The system of claim 16, wherein at least one of said retransmit data packets further comprises a retransmit segment identifier, and said retransmit segment identifier specifies a location in said data payload of said segment in said retransmit data packet associated with said one of said missing packet identifiers.

18. The system of claim 15, wherein said processing element is further configured during said configuring for generating said header portion for said status control packet, wherein said generating further comprises:
identifying a greatest SN of said transmit data packets received at said receiving unit; and
constructing said header portion to include a next SN comprising said greatest SN which has been incremented by 1.

19. The system of claim 15, wherein said status payload portion comprises one or more negative acknowledgement (NACK) fields, each of said NACK fields including one of said missing packet identifiers.

20. The system of claim 19, wherein said one of said missing packet identifiers is associated with said segmented packet identifier, and wherein a one said NACK fields associated with said segmented packet identifier comprises a beginning segment offset (BSO) identifier and an ending segment offset (ESO) identifier for specifying said location of said segment transmitted in said segmented data packet in said one of said data blocks.

21. A digital communications system for delivering one or more data blocks, the system comprising at least one receiving unit, said receiving unit comprising:
a storage element for receiving a plurality of transmit data packets and least one retransmit data packet from a sending unit; and
a processing element communicatively coupled to said storage element, said processing element for configured for:
recognizing a failure to receive at least one other transmit data packet (missing data packet) from said sending unit, and
configuring at least a status control packet for transmission to said sending unit, said control packet comprising a header including a next packet identifier for a next data packet anticipated to be received and at least one status payload portion including at least one missing packet identifier, said missing packet identifier comprising said transmit packet identifier for said missing data packet, wherein said retransmit data packet comprises at least a segment of said data payload in said missing data packet associated with said missing packet identifier, and said status control packet has additional bits in at least one of said header portion and said status payload portion for increasing a total bit count for said status control packet to a whole number of bytes.

22. The system of claim 21, wherein said transmit packet identifier comprises a transmit sequence number (SN), said transmit SN specifying said sequence of transmission of transmit data packets from said sending unit, and each of said retransmit data packets further comprises a retransmit SN said retransmit SN specifying said transmit SN associated with said data payload in each of said retransmit data packets.

23. The system of claim 21, wherein said status payload portion comprises one or more negative acknowledgement (NACK) fields, each of said NACK fields including one of said missing packet identifiers, said one of said missing packet identifiers is associated with said segmented packet identifier, and
wherein a one said NACK fields associated with said segmented packet identifier comprises a starting segment offset (BSO) identifier and an ending segment offset (ESO) identifier for specifying said location of said segment transmitted in said segmented data packet in said one of said data blocks.

24. The method of claim 8, wherein said header portion for said status control packet comprises one or more bits to create a byte-complete packet, said byte-complete packet is an integer number of octets in length.

25. The system of claim 18, wherein said header portion for said status control packet comprises one or more bits to create a byte-complete packet, said byte-complete packet is an integer number of octets in length.

* * * * *